United States Patent [19]

Ohuchi

[11] Patent Number: 4,853,847
[45] Date of Patent: Aug. 1, 1989

[54] DATA PROCESSOR WITH WAIT CONTROL ALLOWING HIGH SPEED ACCESS

[75] Inventor: Mitsurou Ohuchi, Tokyo, Japan

[73] Assignee: NEC Corporation, Tokyo, Japan

[21] Appl. No.: 41,516

[22] Filed: Apr. 23, 1987

[30] Foreign Application Priority Data

Apr. 23, 1986 [JP] Japan .................. 61-95565

[51] Int. Cl.[4] ............... G06F 13/14; G06F 13/20; G06F 3/14
[52] U.S. Cl. .................................................. 364/200
[58] Field of Search ... 364/200 MS File, 900 MS File

[56] References Cited

U.S. PATENT DOCUMENTS

| | | |
|---|---|---|
| 3,993,981 | 11/1976 | Cassarino, Jr. et al. ............ 364/200 |
| 4,041,473 | 8/1977 | Bardotti et al. ...................... 364/200 |
| 4,245,301 | 1/1981 | Rokutanda et al. ................. 364/200 |
| 4,488,229 | 12/1984 | Harrison ............................... 364/200 |
| 4,494,186 | 1/1985 | Goss et al. ........................... 364/200 |
| 4,495,571 | 1/1985 | Staplin, Jr. et al. ................. 364/200 |
| 4,547,849 | 10/1985 | Louie et al. .......................... 364/200 |
| 4,559,595 | 12/1985 | Boudreau et al. ................... 364/200 |
| 4,587,609 | 5/1986 | Boudreau et al. ................... 364/200 |

Primary Examiner—Archie E. Williams, Jr.
Assistant Examiner—Danh Phung
Attorney, Agent, or Firm—Foley & Lardner, Schwartz, Jeffery, Schwaab, Mack, Blumenthal & Evans

[57] ABSTRACT

A slave processor adapted to execute a read/write operation in response to a read/write request signal from a master processor, comprises a first circuit for performing a write operation during a predetermined period of time from the moment a first write request signal is made inactive from an active condition. An second circuit is provided for generating, when another access request signal such as a second write request signal or a read request signal is made active during the above predetermined period of time, an active wait signal requiring the master processor to maintain the second access request signal in an active condition. The second circuit also operates to delay an operation indicated by the second access request signal.

6 Claims, 6 Drawing Sheets

DATA PROCESSOR WITH WAIT CONTROL ALLOWING HIGH SPEED ACCESS

BACKGROUND OF THE INVENTION

1. Field of the Invention

The present invention relates to a data processor allowing a high speed access, and more specifically to a slave processor adapted to execute a read/write operation in response to a read/write request from a master processor, the slave processor having a wait control allowing a high speed operation of the master processor particularly in the write operation.

2. Description of related art

Conventionally, in so-called master-slave processor systems, when a master processor dispatches a read request or write request to a slave processor, operation will be executed in the following sequence:

In the case of read operation, the master processor activates a read request signal to the slave processor. Immediately upon receipt of this active read request signal, the slave processor starts a read operation. On the other hand, the master processor is required to continue to maintain the read request signal in an active condition until the slave processor has completed preparation of a read data. The reason for this is that the master processor has to receive the data before it makes the read request signal inactive, and on the other hand, the slave processor requests the master processor to wait until the slave processor completes the preparation of a read data. This wait operation is controlled by a so-called wait signal or read signal. Namely, the slave processor will maintain the wait signal as active until it prepares the read data, and the master processor will maintain the read request signal in an active condition until the wait signal is rendered inactive.

A write operation is performed similarly to the sequence of the read operation mentioned above, except for the active period of a wait signal. Namely, in the case of a write operation, the wait signal is maintained active until the slave processor completes the writing of data inputted from the master processor. This purpose is to maintain the data to be written to the slave processor by the master processor without any change. Therefore, the master processor is required to continue to maintain the write request signal active in a period corresponding to the active period of the wait signal.

As will be apparent from the above description, the conventional wait control is disadvantageous in that an access time of the master processor to the slave processor will inevitably become long in the case that the slave processor needs a long time of read data preparation or a long time of data write operation. Particularly, the larger the frequency of accesses to the slave processor is, the operation speed of the overall master-slave processor system will become lower.

SUMMARY OF THE INVENTION

Accordingly, it is an object of the present invention to provide a data processor which has overcome the above mentioned drawback of the conventional system.

Another object of the present invention is to provide a data processor allowing a high speed access from an external device.

Still another object of the present invention is to provide a data processor which can be used as a slave processor in a master-slave processor system and which allows a high speed read/write operation of the master processor to the slave processor.

The above and other objects of the present invention are achieved in accordance with the present invention by a data processor adapted to execute a read/write operation in response to a read/write request signal from a master processor, comprising a first unit for performing a write operation during a predetermined period of time from the moment a first write request signal is made inactive from an active condition, and a second unit for generating, when another access request signal such as a second write request signal or a read request signal is made active during the above predetermined period of time, and active wait signal requiring the master processor so as to maintain the second access request signal in an active condition, the second unit also operating to delay an operation indicated by the second access request signal.

In the case of a write operation to the slave processor, the master processor is allowed to make a write request signal inactive if the information required for a write operation (a write request signal, address and data to be written) has been transferred to the slave processor, even if the actual write operation has not yet been completed. Therefore, a wait signal is not required for a first write request signal. With this arrangement, the master processor can operate at a high speed. Instead of dispatching the wait signal for the first write request, the first unit ensures the write operation to be executed in the above mentioned predetermined period of time. However, if a second access request signal is generated before the write operation is completed, the second unit generates the wait signal to the master processor, similarly to the conventional master-slave processor system.

The above and other objects, features and advantages of the present invention will be apparent from the following description of the preferred embodiment of the invention with reference to the accompanying drawings.

DESCRIPTION OF THE PREFERRED EMBODIMENT

Figure 1:
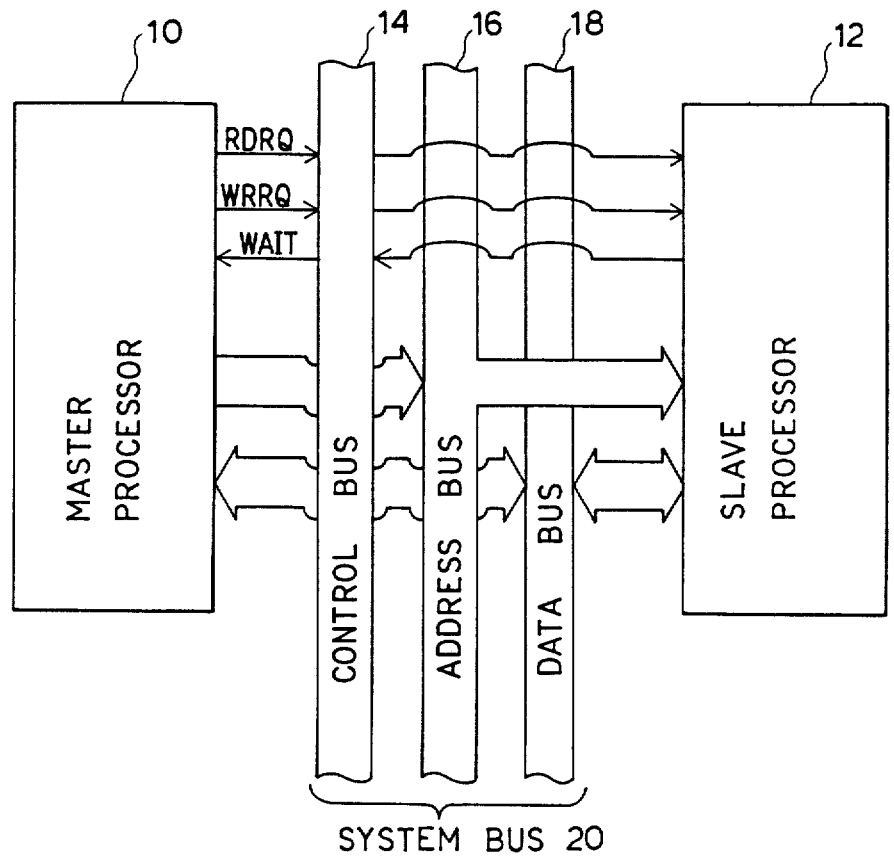
FIG. 1 is a block diagram showing the overall structure of a master-slave processor system to which the present invention can be applied.

Referring to FIG. 1, there is shown one example of a master-slave processor system, which comprises a master processor 10 and a slave processor 12 coupled to each other through a control bus 14, an address bus 16 and a data bus 18 of a system bus 20. Particularly, in a read/write operation of the master processor 10 to the slave processor 12, the master processor 10 outputs a read request signal RDRQ and write request signal WRRQ to the slave processor 12 through the control bus 14, and also receives a wait signal WAIT from the slave processor 12 through the control bus 14, if necessary.

Figure 2:
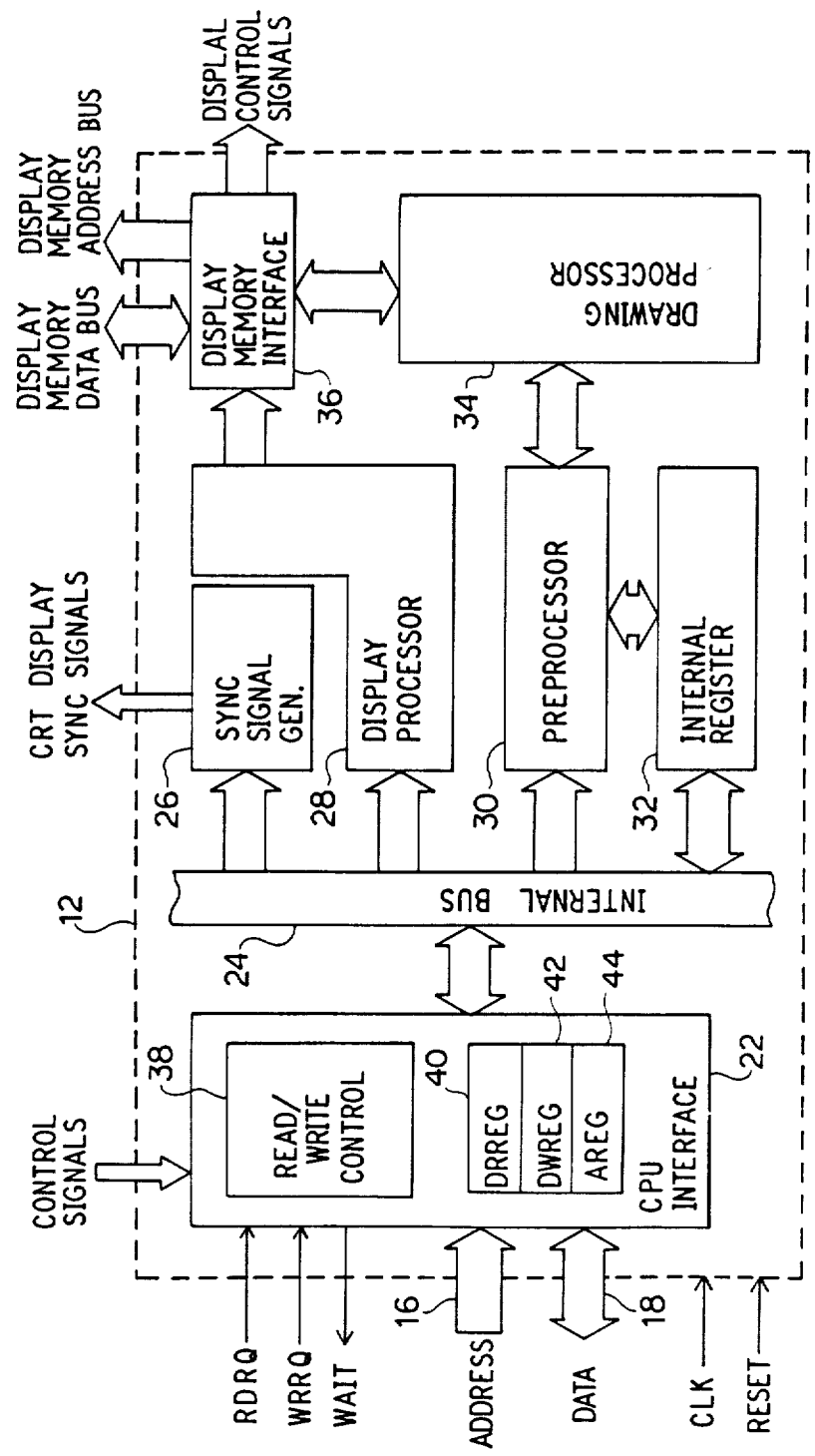
FIG. 2 is a block diagram of one example of the slave processor shown in FIG. 1.

Turning to FIG. 2, there is shown one example of the slave processor. The shown slave processor is designed for a graph display controller, and includes a CPU interface 22 which is coupled to the address bus 16 and the data bus 18. Also, the CPU interface 22 receives the read request signal RDRQ and the write request signal WRRQ, and outputs the wait signal WAIT. The CPU interface 22 is coupled to an internal bus 24, which is in turn coupled to various internal circuits such as a signal generator 26, a display processor 28, a preprocessor 30 and an internal register 32. The preprocessor 30 is also coupled to an internal register 32 and a drawing processor 34, which is in turn coupled to a display memory interface 36. This display memory interface 36 is also coupled to the display processor 28.

Figure 3:
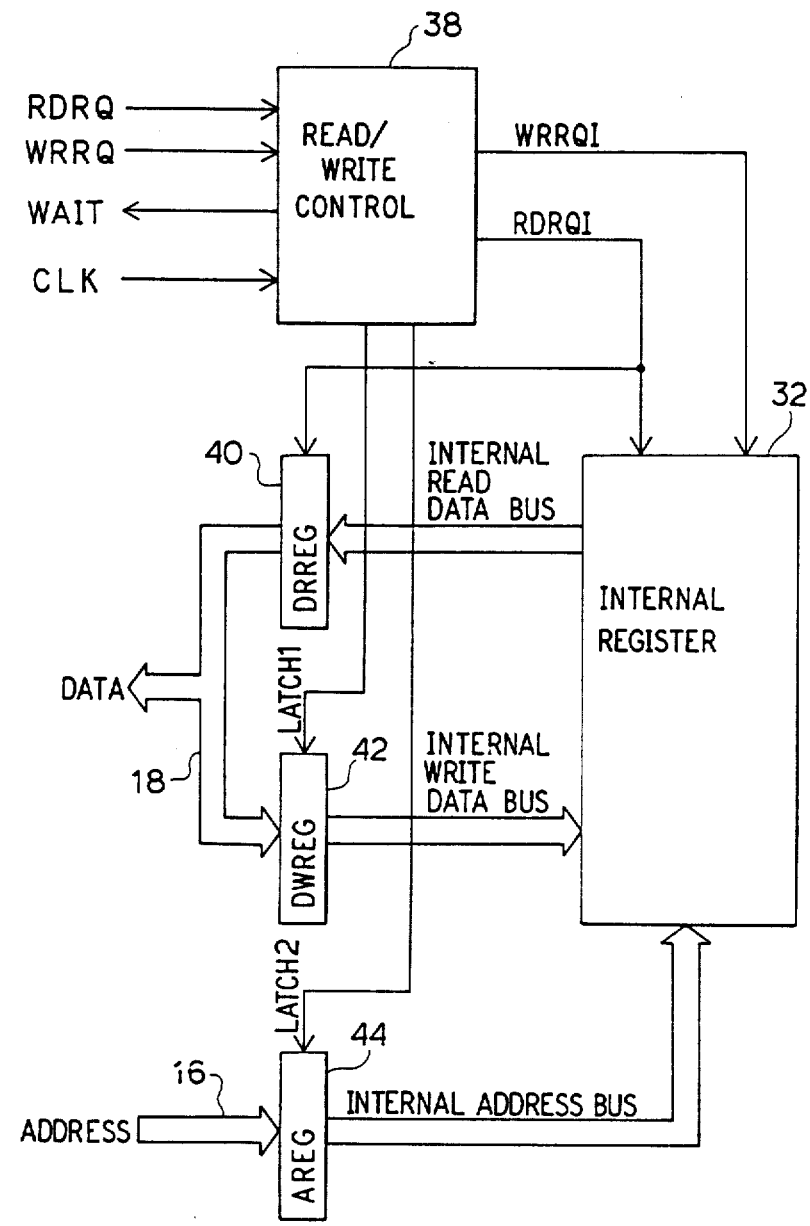
FIG. 3 is a block diagram of an input portion of the slave processor shown in FIG. 2.

The CPU interface 22 includes a read/write controller 38 as shown in FIG. 3, which is adapted to receive the read request signal RDRQ, the write request signal WRRQ, and a clock signal CLK, and to generate the wait signal WAIT. Further, the read/write controller 38 generates an internal read request signal RDRQI and an internal write request signal WRRQI to the internal register 32. The CPU interface 22 also includes a read data register 40, a write data register 42 and an address register 44, which are controlled by the internal read request signal RDRQI, and two latch signals LATCH 1 and LATCH 2 from the read/write controller 38, respectively. The read data register 40 and the write data register 42 are put in parallel between the data bus 18 and the internal register 32, and the address register 44 is located between the address bus 16 and the internal register 32.

Figure 4:
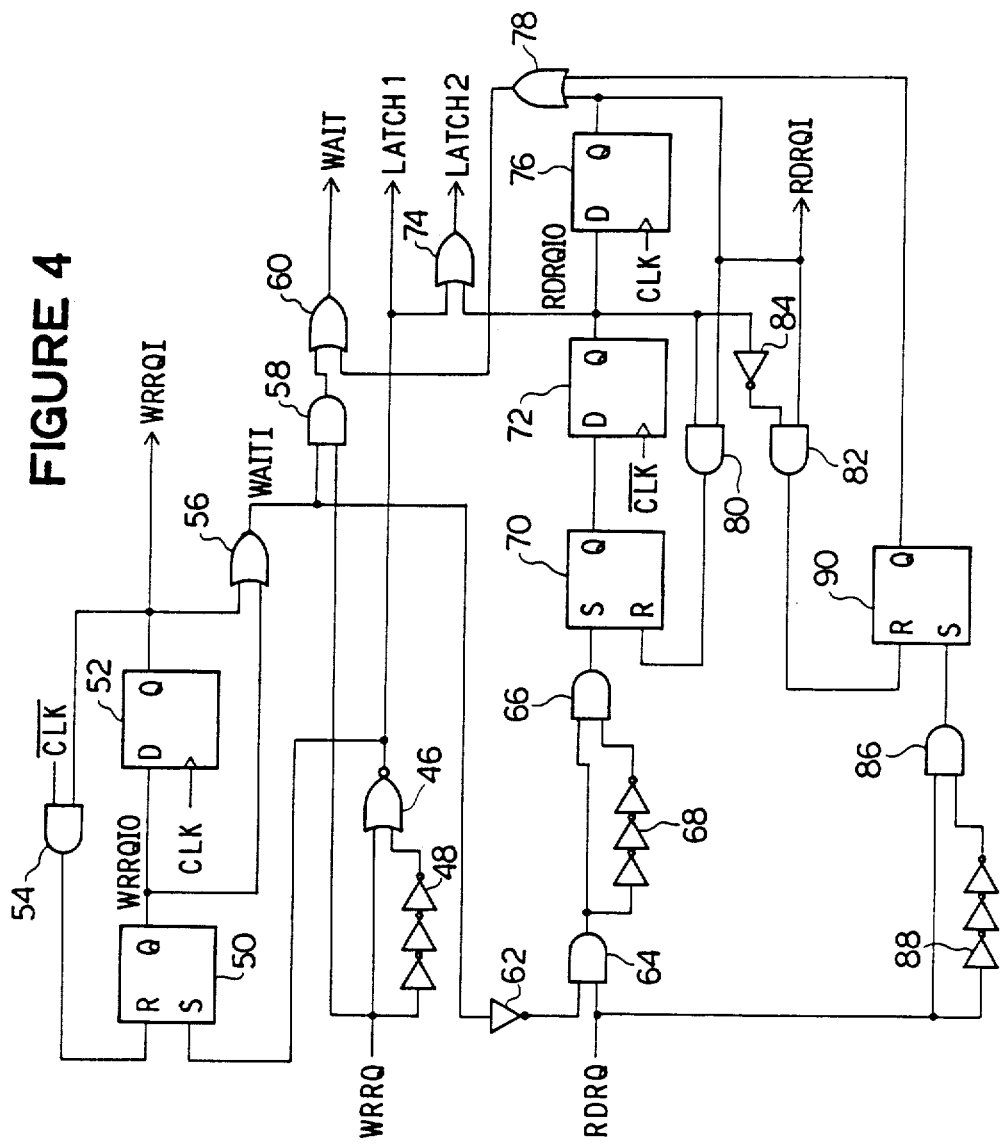
FIG. 4 is a circuit diagram of the read/write controller shown in FIG. 3.

Turning to FIG. 4, there is shown a detailed circuit diagram of the read/write controller 38. As shown in FIG. 4, the read/write controller 38 includes a NOR circuit 46 receiving at its one input the write request signal WRRQ and at its other input the same WRRQ signal delayed and inverted by a series of inverters 48. Thus, after the WRRQ signal is rendered active (or to a high level), this NOR circuit 46 generates an active (or high level) latch signal LATCH 1 when the signal WRRQ becomes inactive again. An output of the NOR circuit 46 is outputted through an OR circuit 74 as another active latch signal LATCH 2.

The output of the NOR circuit 46 is connected to a set input of an RS flip-flop 50, which generates at its Q output an original internal write request signal WRRQIO to a D input of a D flip-flop 52. This D flip-flop 52 generates at its Q output the internal write request signal WRRQI, which is fed back through an AND circuit 54 to a reset input of a RS flip-flop 50.

Further, the WRRQIO signal and the WRRQI signal are inputted to an OR circuit 56, which in turn generates an internal wait signal WAITI. This WAITI signal is inputted to one input of an AND circuit 58 which receives at its other input the write request signal WRRQ. This AND circuit 58 is connected at its output to one input of an OR circuit 60 adapted to generate the wait signal WAIT.

In addition, the internal wait signal WAITI is supplied through an inverter 62 to one input of an AND circuit 64 whose other input is connected to receive the read request signal RDRQ. An output of the AND circuit 64 is connected directly to one input of another AND circuit 66 and also through a delay inverter 68 to the other input of the same AND circuit 66. An output of the AND circuit 66 is connected to an set input of a RS flip-flop 70, whose Q output is connected to a D input of D flip-flop 72. This D flip-flop 72 generates at its Q output an original internal read request signal RDRQIO. This RDRQIO signal is applied to one input of the OR circuit 74, which is in turn connected at its other input to receive the latch signal LATCH 1 so as to generate the second latch signal LATCH 2.

Furthermore, the RDRQIO signal is fed to a D input of another D flip-flop 76 which generates at its Q output the internal read request signal RDRQI. This RDRQI signal is connected to respective one inputs of an OR circuit 78 and two AND circuit 80 and 82. An output of the OR circuit 78 is connected to the other input of the OR circuit 60. The AND circuit 80 receives the RDRQIO signal at its other input and is connected at its output to a reset input of the RS flip-flop 70. The AND circuit 82 has its other input connected to receive the RDRQIO signal through an inverter 84.

In addition, the read request signal RDRQ is also applied directly to one input of an AND circuit 86 and through a delay inverter 88 to the other input of the same AND circuit 86. An output of the AND circuit 86 is connected to a set input of a RS flip-flop 90, whose reset input is connected to an output of the AND circuit 82 and whose Q output is connected to the other input of the OR circuit 78.

Figure 5:
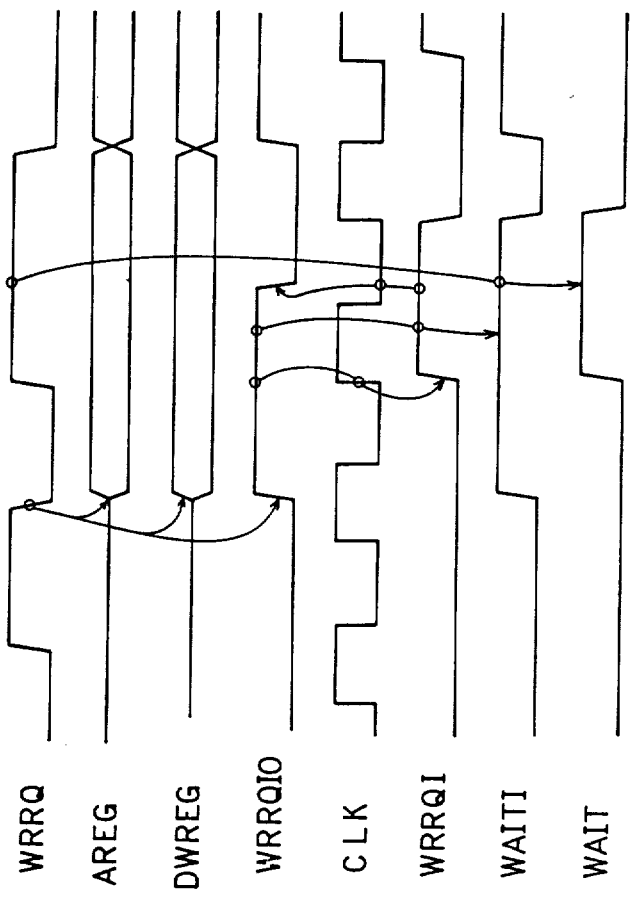
FIG. 5 is a timing chart illustrating the write control operation of the read/write controller.
Figure 6A:
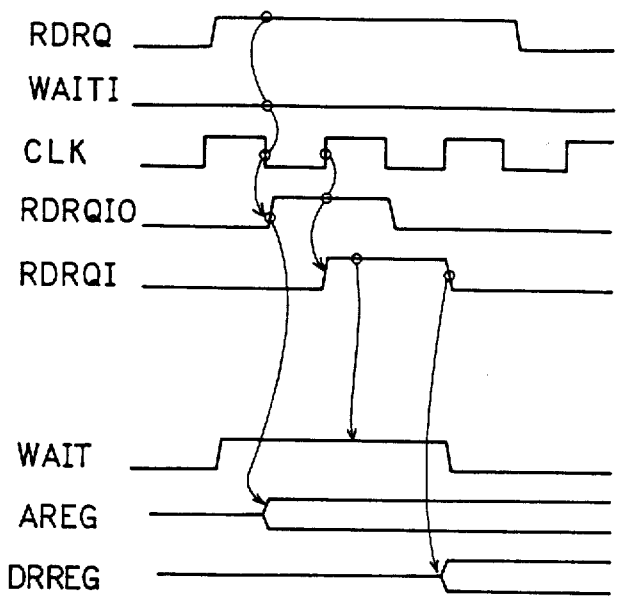
FIG. 6A and 6B are timing charts illustrating the read control operation of the read/write controller.

Next, description will be made of the operation of the read/write controller 38. First, a write operation will be explained with FIG. 5, and then, a read operation will be explained with FIGS. 6A and 6B.

In the case that the master processor 10 writes data to the slave processor 12, the master processor 10 generates an active write request signal WRRQ to the slave processor 12. When the WRRQ signal is returned to an inactive condition (a low level), the write operation is started at the falling edge of the WRRQ signal. Namely, as seen from FIG. 5, the latch signals LATCH 1 and LATCH 2 are generated so that the write data on the bus 18 is latched in the write data register 42 DWREG and the address on the bus 16 is latched in the address register 44 AREG. At the same time, the original internal write request signal WRRQIO is rendered active. After the WRRQIO signal is rendered active, the D flip-flop 52 generates the internal write request signal WRRQI in synchronism with the clock signal CLK, and during the active period of the WRRQI signal, the content in the register 42 is written in the internal register 32 at an address indicated by the address register 44.

On the other hand, the internal wait signal WAITI is maintained active to ensure that the content of the registers 42 and 44 is kept until the write operation is completed. However, at this situation, the wait signal WAIT externally outputted from the read/write controller 38 is not rendered active. As seen from FIG. 5, the wait signal WAIT will be made active only at the next active WRRQ signal or the RDRQ signal is generated during the active period of the internal wait signal WAITI. The WAIT signal is generated by the AND circuit 58 receiving the WRRQ signal and the WAITI signal, and also by the OR circuit 78 receiving the RDRQ signal through the RS flip-flop 90.

On the other hand, in the case of a read operation, the master processor 10 generates an active read request signal RDRQ to the slave processor 12. At that time, if the internal wait signal is inactive, the RDRQ signal is applied to the RD flip-flop 70 through the AND circuits 64 and 66. Therefore, as seen from FIG. 6, the original internal read request signal RDRQIO is rendered active in synchronism with the falling of the clock CLK (i.e., the rising of the inverted clock $\overline{\text{CLK}}$). At this time, the latch signal LATCH 2 is generated to register the address on the bus 16 in the address register 44. Then, the internal read request signal RDRQI is rendered active in synchronism with the rising of the next clock CLK, i.e., later than the RDRQIO signal a half period of the clock. During the active period of the RDRQI signal, a read data is prepared, and then, is latched in the read data register 40 at the falling of the RDRQI signal. On the other hand, the wait signal is maintained active from the moment the RDRQ signal is made active to the moment the RDRQI signal is made inactive.

Figure 6B:
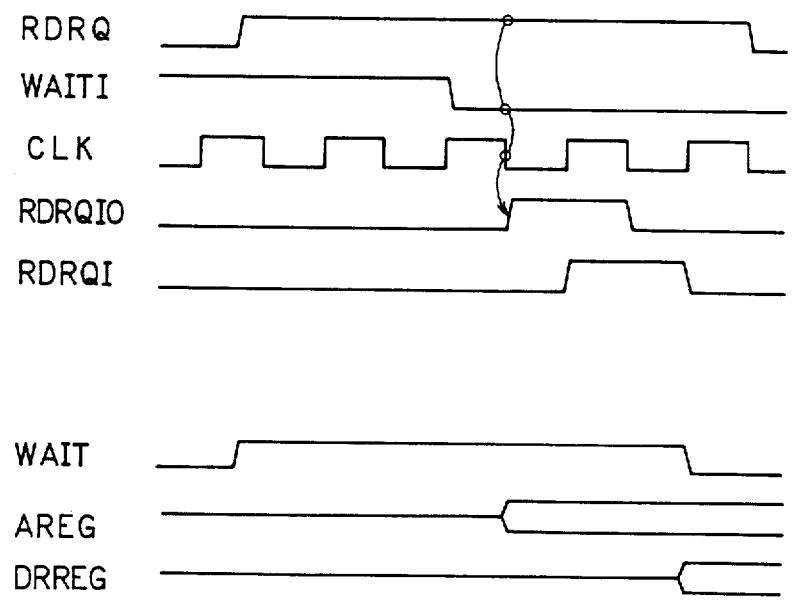

If the internal wait signal WAITI is already maintained active when the RDRQ signal is rendered active as shown in FIG. 6B, the original internal read request signal RDRQIO is maintained inactive until the WAITI signal is made inactive. This is because the RDRQ signal is blocked by the AND circuit 64.

As mentioned above, the WIATI signal is made active during a write operation. Therefore, with the blocking of the RDRQ signal by the active WIATI signal, since the active RDRQIO signal is not generated, the content of the address register is protected from the address information for the read operation. After the WAITI signal is rendered inactive, an operation will be performed similarly to the case described with reference to FIG. 6A. Thus, the WAIT signal is maintained active until the RDRQI signal is rendered inactive.

As seen from the above, the slave processor does not generate a wait signal WAIT in response to a first write request, and therefore, the master processor can operate at a high speed since it is not put in a wait condition. The effect is realized by a two stage pipeline write operation control of the slave processor. If the master processor continuously generates write requests, it is a matter of course that the wait signal is generated. However, in an actual operation, write requests do not continue and another operation will be necessarily interposed between each pair of adjacent write requests in time sequence. Therefore, the write operation will be executed substantially without wait. Thus, the operation of the overall master-slave processor can be substantially speeded up.

In addition, the present invention can be realized in a slave processor which can execute not only a simple read/write operation but also a data transmission with a master processor through an internal register for a specific processing function. In this case, a simple priority control function is additionally required to adjust a register access request for internal processing and a register access request from the master processor.

The invention has thus been shown and described with reference to the specific embodiment. However, it should be noted that the invention is in no way limited to the details of the illustrated structures but changes and modifications may be made within the scope of the appended claims.

I claim:

1. A data processor for executing a read/write operation in response to a read/write request signal from a master processor, comprising:

first means coupled to the master processor to receive the read/write request signal from the master processor and for performing a write operation during a predetermined period of time from the moment a first write request signal is brought to an inactive condition from an active condition, and second means coupled to the master processor to receive the read/write request signal from the master processor and for generating, when another access request signal such as a second write request signal or a read request signal is made active during said predetermined period of time, an active wait signal requiring the master processor to maintain said another access request signal in an active condition, the second means also operating to delay an operation indicated by said another access request signal wherein the second means includes a read/write controller receiving the read request signal or the second write request signal and generating the active wait signal to the master processor only when a write operation is executed and when a read request signal or a write request signal is further inputted during the predetermined period of time from the moment the first write request signal is brought to the inactive condition;

said data processor further includes an internal register, a read data register coupled between the internal register and a data bus for temporarily holding data read from the internal register, a write data register coupled between the internal register and the bus for temporarily holding data to be written to the internal register, and an address register coupled between the internal register and an address bus for holding an address of the internal register to be accessed from the master processor, said internal register, said read data register, said write data register, and said address register being controlled by the read/write controller.

2. A processor claimed in claim 1 wherein the read/write controller responds to the first write request signal to cause the write data register and the address register to latch information on the data bus and the address bus, respectively, and when the second write request signal is generated before the write operation based on the first write request signal is completed, the read/write controller generates said active wait signal to the master processor without updating the write data register and the address register.

3. A processor claimed in claim 1 wherein the read/write controller responds to the first write request signal to cause the write data register and the address register to latch information on the data bus and the address bus, respectively, and then the read request signal is generated before the write operation based on the first write signal is completed, the read/write controller generates said active wait signal to the master processor without updating the address register.

4. A master/slave processor system including a master processor for generating a read request signal and write request signal and a slave processor coupled to the master processor through a data bus and an address bus and receiving the read or write request signal from the master processor for executing a read or write operation in response thereto, said slave processor comprising:

a read data register coupled to the data bus for outputting a read data to the master processor, a write data register coupled to the data bus for receiving a write data from the master processor, an address register coupled to the address bus for receiving an address from the master processor, an internal register coupled to the read data register, the write data register and the address register for storing data transferred to and from said read and write data registers, respectively, and a read/write controller coupled to the master processor to receive the read request signal and the write request signal from the master processor and also receiving a clock signal, and for generating an internal write signal and an internal read signal to the internal register;

said read/write controller responding to a first read or write request signal for generating a latch signal to the read data register or the write data register and the address register, and also for activating the internal read or write signal to the internal register when the read or write request signal is inputted under a condition in which the internal read and write signals are inactive, so that a read or write operation is performed during a predetermined period of time from the moment the read or write request signal is inputted, said read/write controller also generating an active wait signal to the master processor, when the read or write request signal is inputted under a condition in which one of the internal read and write signals is active, so that the master processor is required to maintain the read or write request signal in an active condition, whereby an operation indicated by the read or write request signal is delayed.

5. A data processor for executing a read/write operation in response to a read/write request signal from a master processor, comprising:

a read data register coupled to a data bus for outputting a read data to the master processor, a write data register coupled to the data bus for receiving a write data from the master processor, an address register coupled to an address bus for receiving an address from the master processor, an internal register coupled to the read data register, write data register and the address register for storing data transferred to and from said read and write data registers, respectively, and a read/write controller coupled to the master processor to receive a read request signal and a write request signal from the master processor, the read/write controller also receiving a clock signal and generating a wait signal to the master processor;

said read/write controller including:

a first logic gate means connected to receive the write request signal for generating a first latch signal to the wirte data register, a first logic circuit means connected to receive the first latch signal and the clock signal for generating an original internal write request signal in response to the first latch signal and an internal write request signal delayed from the original internal write request signal and in synchronism with the clock signal, the internal write request signal being supplied to the internal register, a second logic gate means connected to receive the original internal write request signal and the internal write request signal for generating an internal wait signal, a second logic circuit means connected to receive the internal wait signal and the read request signal, the second logic circuit means generating an original internal read request signal in synchronism with the clock signal after the read request signal is generated and after the internal wait signal is brought into an inactive level, and the second logic circuit means being timed by the clock signal for generating an internal read request signal delayed from the original internal read request signal being supplied to the internal register and the read register, a third logic gate means connected to receive the first latch signal and the original internal read request signal for generating a second latch signal to the address register, and a wait signal generation means including an AND gate having a first input connected to receive the write request signal and a second input connected to receive the internal wait signal and an OR gate having a first input connected to an output of the AND gate and a second input connected to receive the internal read request signal for generating the wait signal to the master processor.

6. A data processor as claimed in claim 5, wherein the first logic gate means includes a NOR gate having a first input connected to directly receive the write request signal and a second input connected to receive the write request signal through a first delayed inverter, wherein the first logic circuit means includes a first RS flipflop having a set input connected to receive the first latch signal for generating at a Q output the original internal write request signals and a first D-type flip-flop having a D input connected to the Q output of the first RS flip-flop and a clock input connected to receive the clock signal, a Q output of the first D-type flipflop generating the internal write request signal and being connected to one input of a first AND gate having an other input connected to receive an inverted signal of the clock signal and an output connected to a reset of the RS flip-flop.

wherein the second logic gate means includes a first OR gate having a first input connected to receive the internal write request signal and a second input connected to the original internal write request signal for generating the internal wait signal at an output, wherein the second logic circuit means includes a second AND gate having a first input connected rto receive the internal wait signal through an inverter and a second input connected to receive the read request signal, a third AND gate having a first input connected directly to an output of the second AND gate and a second intput connected through a second delayed inverter to the output of the second AND gate, a second RS flip-flop having a set input connected to an output of the third AND gate, a second D-type flip-flop having a D input connected to a Q output of the second RS flip-flop and a clock input connected to receive the inverted signal of the clock signal for generating at a Q output of the third D-type flip-flop the original internal read request signal, a third D-type flip-flop having a D input connected to the Q output of the second D-type flip-flop and a clock input connected to receive the clock signal for generating at the Q output the internal read request signal, a third AND gate having a first input connected to the Q output of the second D-type flip-flop and a second input connected to the Q output of the third D-type flip-flop, an output of the third AND gate being connected to a reset input of the second RS flip-flop, a fifth AND gate having a first input connected to directly receive the read request signal and a second input connected to receive the read request signal through a third delayed inverter, a sixth AND gate having a first input connected to the Q output of the second D-type flip-flop through an inverter and a second input connected to the Q output of the third D-type flip-flop, a third RS flip-flop having a set input connected to an output of the fifth AND gate and a reset input connected to an output of the sixth AND gate, and a second OR gate having a first input connected to the Q output of the third RS flip-flop and a second input connected to the Q output of the third D-type flip-flop, and output of the second OR gate being connected to the second input of the OR gate of the wait signal generation means, and wherein the third logic gate means includes an OR gate having a first input connected to receive the first latch signal and a second input connected to receive the original internal read request signal for generating the second latch signal at an output.

* * * * *